United States Patent [19]

Yamamoto et al.

[11] Patent Number: 5,074,468
[45] Date of Patent: Dec. 24, 1991

[54] AUTOMATIC WATER SPRINKLER CONTROL SYSTEM

[75] Inventors: Harushi Yamamoto, Osaka; Naoki Otsuka, Nishinomiya, both of Japan

[73] Assignees: Sekisui Koji Kabushiki Kaisha, Osaka; Konan Denki Kabushiki Kaisha, Nishinomya, both of Japan

[21] Appl. No.: 474,038

[22] PCT Filed: Aug. 28, 1989

[86] PCT No.: PCT/JP89/00874

§ 371 Date: Apr. 17, 1990

§ 102(e) Date: Apr. 17, 1990

[87] PCT Pub. No.: WO90/01868

PCT Pub. Date: Mar. 8, 1990

[30] Foreign Application Priority Data

Aug. 29, 1988 [JP] Japan .................. 63-214491

[51] Int. Cl.⁵ .................. B05B 12/00; A01G 25/16
[52] U.S. Cl. .................. 234/69; 239/70; 239/201; 251/30.02
[58] Field of Search .......... 239/66, 69, 70, 200, 239/201, 207; 251/30.01, 30.02

[56] References Cited

U.S. PATENT DOCUMENTS

| | | | |
|---|---|---|---|
| 3,000,398 | 9/1961 | Link | 239/70 |
| 3,372,899 | 3/1968 | McPherson | 251/30.02 |
| 3,386,460 | 6/1968 | Dean | 239/70 |
| 3,791,619 | 2/1974 | Pett | 251/30.02 |
| 3,913,884 | 10/1975 | Rolfe | 251/30.02 |
| 4,603,832 | 8/1986 | Sjoquist | 251/30.02 |
| 4,852,802 | 8/1989 | Iggulden et al. | 239/70 |

FOREIGN PATENT DOCUMENTS

| | | |
|---|---|---|
| 16861/47 | 11/1950 | Australia . |
| 33596/71 | 10/1974 | Australia . |
| 54743/73 | 2/1976 | Australia . |
| 66585/74 | 4/1978 | Australia . |
| 42410/78 | 6/1980 | Australia . |
| 50145/79 | 12/1982 | Australia . |
| 53278/79 | 5/1984 | Australia . |
| 59621/80 | 9/1984 | Australia . |
| 31646/84 | 8/1987 | Australia . |
| 2707219 | 1/1979 | Fed. Rep. of Germany . |
| 2836415 | 3/1979 | Fed. Rep. of Germany . |

*Primary Examiner*—Andres Kashnikow
*Assistant Examiner*—Karen B. Merritt
*Attorney, Agent, or Firm*—Armstrong, Nikaido, Marmelstein, Kubovcik & Murray

[57] ABSTRACT

An automatic control system, having a main control system with wireless communication equipment, with a water sprinkling device disposed in an area to be sprinkled with water and adapted to sprinkle water over this area, and water piping installed between a water source and the water sprinkling device, and adapted to distribute water from the water source to the water sprinkling device. A water sprinkling control system is installed on the ground in a position close to the water sprinkling device and adapted to control the water sprinkling device. The water sprinkling control system includes a hydraulic valve disposed in the water piping close to the sprinkling device which has a water channel connecting an inflow passageway with a flow passageway connected to a pilot line. A two-way pilot solenoid valve is connected at one port thereof to the hydraulic valve through the pilot line, and at the other port to a drain piping. The water sprinkling control system also has a wireless signal receiving-transmitting system which receives a control signal from the main control system and transmits an answer signal thereto, a solenoid valve control device disposed in the vicinity of the two-way pilot solenoid valve, connected to the wireless signal receiving-transmitting device to control the two-way pilot solenoid valve, and a power supply which supplies electric power to the wireless signal receiving-transmitting device and the solenoid valve device.

2 Claims, 5 Drawing Sheets

AUTOMATIC WATER SPRINKLER CONTROL SYSTEM

TECHNICAL FIELD

The present invention relates to an automatic water sprinkler control system to be used in comparatively large areas such as farm lands including orchards and truck farms, golf courses and so on.

BACKGROUND ART

The hitherto-known system of this type comprises a multiplicity of water sprinkling means such as sprinklers disposed in strategical positions, water pipes disposed in or on the ground and connecting said water sprinkling means with a valve means equipped with a solenoid valve built into the water pipe in a position close to each of said water sprinkling means and a control wiring buried underground between said valve means and a control board installed in a control room or the like, with said valve means being opened and closed from said control board.

However, since the control wiring is buried underground in the above conventional system, there is the problem that when water lines are installed in the ground alongside the control wiring, the control wiring is sometimes damaged during the maintenance of the water lines. Moreover, in the case of a golf course, since the control wiring generally extends several kilometers, voltage drops and insulation failures tend to occur and there is consequently the additional drawback that a thunderbolt falling nearby damages the control wiring. Furthermore, when the control wiring is affected by a thunderbolt or other cause, it is very difficult to locate the point of damage because of underground installation so that much time and labor are involved in inspection and repair work.

Developed to overcome the above-mentioned drawbacks of the conventional system, the present invention has as its object to provide an automatic water sprinkler control system which does not require an extensive control wiring and, hence, is completely free from the risk of damage to the wiring which is associated with the maintenance of water piping and, also, from the risk of malfunctioning of control valves which is associated with such damages.

It is a further object of the present invention to provide a system which requires only a short installation time and a short time for additional work if such work becomes necessary after initial installation, and involves little earth-moving work, thus being suitable for installations, such as golf courses, where damages to the ground surface are serious problems.

It is a still further object of the present invention to provide a system wherein the control valves can be operated positively and accurately even if air or dust enters into the pipeline.

DISCLOSURE OF THE INVENTION

The present invention relates to an automatic water sprinkler control system comprising a main control means having a wireless communications equipment, one or more water sprinkling means installed in an area to be sprinkled with water and adapted to sprinkle water over said area, a water piping installed on or in the ground between a water source and said water sprinkling means and adapted to distribute water from said water source to said water sprinkling means, and a water sprinkling control means installed on the ground in a position close to said water sprinkling means and adapted to control said water sprinkling means, said water sprilkling control means comprising hydraulic valve disposed in said water piping in a position close to said water sprilkling means, a two-way pilot solenoid valve connected at one port thereof to said hydraulic valve through a pilot line and at the other port to a drain piping and adapted to control said two-way pilot solenoid valve, a wireless signal receiving-transmitting means adapted to receive a control signal from said main control means and to transmit an answer signal to said main control means, a solenoid valve control means which is disposed in the vicinity of said two-way pilot solenoid valve, connected to said wireless signal receiving-transmitting means and adapted to control said two-way pilot solenoid valve according to said control signal received by said wireless signal receiving means, and a power supply means for supplying electric power to said wireless signal receiving-transmitting means and said solenoid valve means.

In the automatic water sprinkler control system of the present invention which includes no control wiring other than the lead wire between the solenoid valve control means and two-way pilot solenoid valve and the hydraulic valve is controlled by the two-way pilot solenoid valve connected thereto through said pilot line, there is no trouble of the control wiring being damaged during maintenance of water piping and the possibility of the system attracting a lightening accident is also low.

Moreover, even if the electrical system is struck and damaged by lightning, restoration work is simple because no excavation work is necessary. Furthermore, since the lead wire between the solenoid valve control means and two-way pilot solenoid valve is the only control wiring present and, moreover, is not buried underground, the installation time can be very brief. Furthermore, since the water sprinkler control means is installed on the ground, even if a need arises for additional work after installation for adjustment or confirmation of sprinkling amount, for instance, the work does not take much time, nor is it necessary to excavate the ground. Therefore, the system can be used advantageously in such installations as golf courses where the ground surface should not be damaged.

Moreover, even if there is an entry of air in the two-way pilot solenoid valve and in pilot line for controlling the hydraulic valve, the air is readily exhausted through the drain line connected to the two-way pilot solenoid valve. As a result, it does not happen that the response of the hydraulic valve is decreased, nor does a water hammer or the like take place, so that the reliability of the system as a whole is high. Furthermore, the hydraulic valve has a diaphragm and is opened and closed by this diaphragm. When this diaphragm is provided with a small-diameter passageway connecting the inflow passageway of said hydraulic valve with the passageway to which said pilot line is connected, the dust which may happen to be caught in the small-diameter passageway is easily dislodged by the motion of the diaphragm so that the passageway is not easily clogged and the possibility of troubles due to dust is reduced. Moreover, when the hydraulic valve is provided with a water channel connecting the inflow passageway with the flow passageway to which said pilot line is connected, with said water channel being provided with an air bleeding orifice which can be opened and closed with respect to the atmosphere, the above removal of air is easily performed by this air bleeding orifice. Furthermore, when a two-position acting valve is used as said two-way solenoid valve, the control signal for controlling the solenoid valve can be a pulse signal and in this case it is not necessary to continuously supply electric energy to the solenoid valve so that the capacity of the power supply can be as much reduced to contribute to the conservation of energy.

BEST MODE FOR CARRYING OUT THE INVENTION

Figure 1:
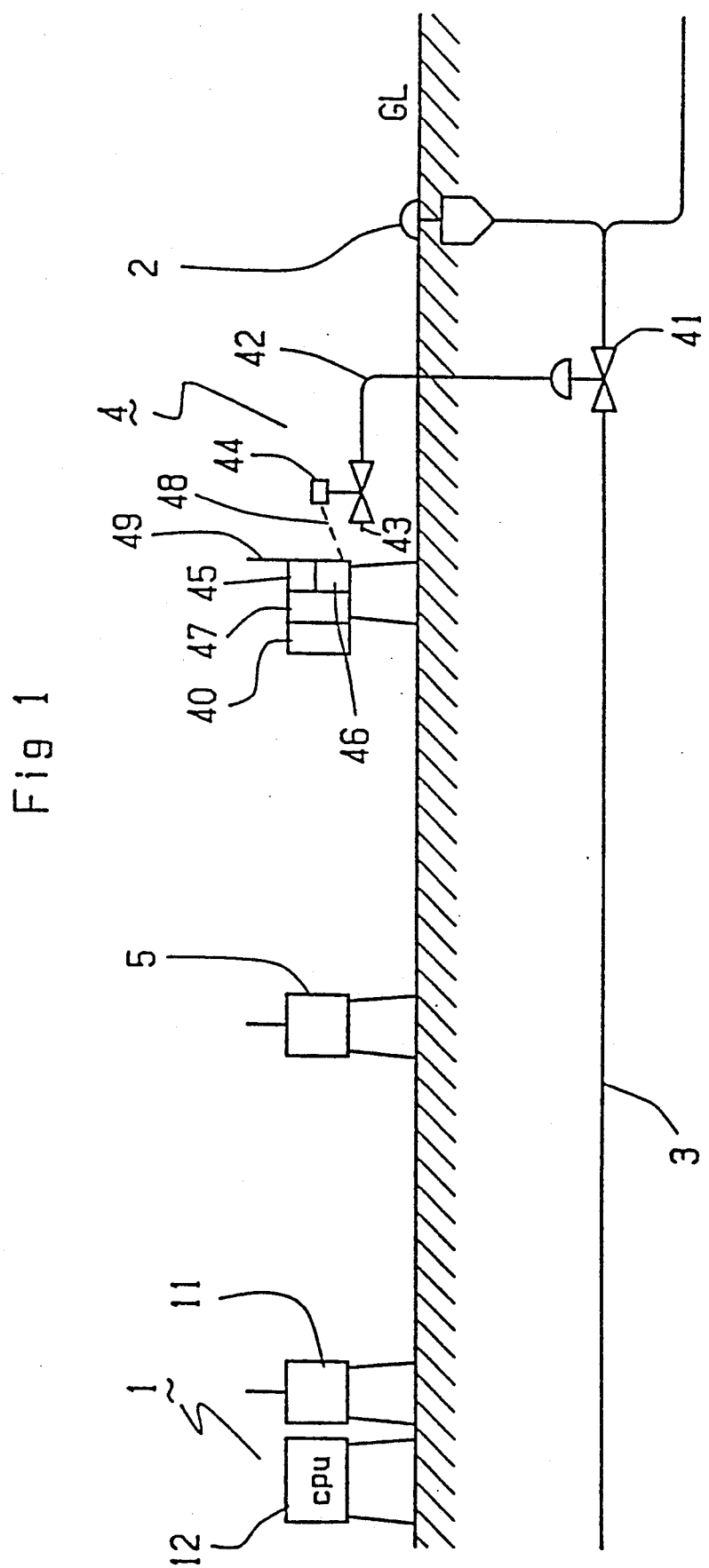
FIG. 1 is a schematic view illustrating an automatic water sprinkler control system embodying the principle of the present invention.

The present invention is described in further detail, reference being had to the accompanying drawings.

The automatic water sprinkler control system of the present invention comprises a main controller 1 as a main control means equipped with a wireless communications equipment 11, one or more water sprinkling means 2, for example sprinklers, which are disposed in an area to be sprinkled with water and adapted to sprinkle the area, a water line 3 which is buried in the ground between a water source (not shown) and said sprinkling means 2 and adapted to supply the sprinkling means 2 with water from said water source, and a sprinkler controller 4 which is disposed on the ground in the vicinity of said sprinkling means 2 and adapted to control the sprinkling means 2. The controller 4 comprises a hydraulic valve 41 disposed within said water line 3 in a position close to said sprinkling means 2, a two-way solenoid pilot valve 44, one port of which communicates with said hydraulic valve 41 through a pilot line 42, with the other port communicating with a water drain line 43, and which is adapted to control said hydraulic valve 41, a wireless signal receiver-transmitter 45 adapted to receive a control signal transmitted from said main controller 1 and to transmit an answer signal to said main controller 1, a solenoid valve controller 46 which is disposed in a position close to said two-way pilot solenoid valve 44 and connected to said signal receiver-transmitter 45 so as to control said two-way pilot solenoid valve 44 according to the control signal received by said signal receiver-transmitter 45, and a battery 47, which may comprise a solar cell 40, as a power source for said signal receiver-transmitter 45 and solenoid valve controller 46.

Referring to FIG. 1, the reference numeral 5 represents a wireless relay which is installed when the system of the present invention is used in cases where a large tract of land is to be sprinkled or the landscape interferes with the propagation of electric signals. In this sense, the wireless relay 5 is not an indispensable unit.

The main controller 1 mentioned above is a unit for controlling the whole system and is generally installed in a control house or room. This controller 1 is equipped with a computer 12 in addition to said wireless communications equipment 11 and the required control data inclusive of sprinkling start and stop time data as inputted or previously stored in the computer 12 are transmitted from the wireless communications equipment 11.

Referring to the sprinkling means 2 mentioned above, tens to hundreds of units are generally installed taking a golf course as an example. It should be understood that the water sprinkling means to be used in the present invention need not be a sprinkler as such but may be a simple water delivery nozzle.

The aforementioned hydraulic valve 41 is installed in the water line 3 in a position close to the sprinkling means 2 for controlling the supply of water to the sprinkling means 2.

While this hydraulic valve 41 may be of an optional design only if the valve may be opened and closed by utilizing changes in the pressure of water, the valves shown in FIGS. 2 to 5 are preferably used.

Figure 2:
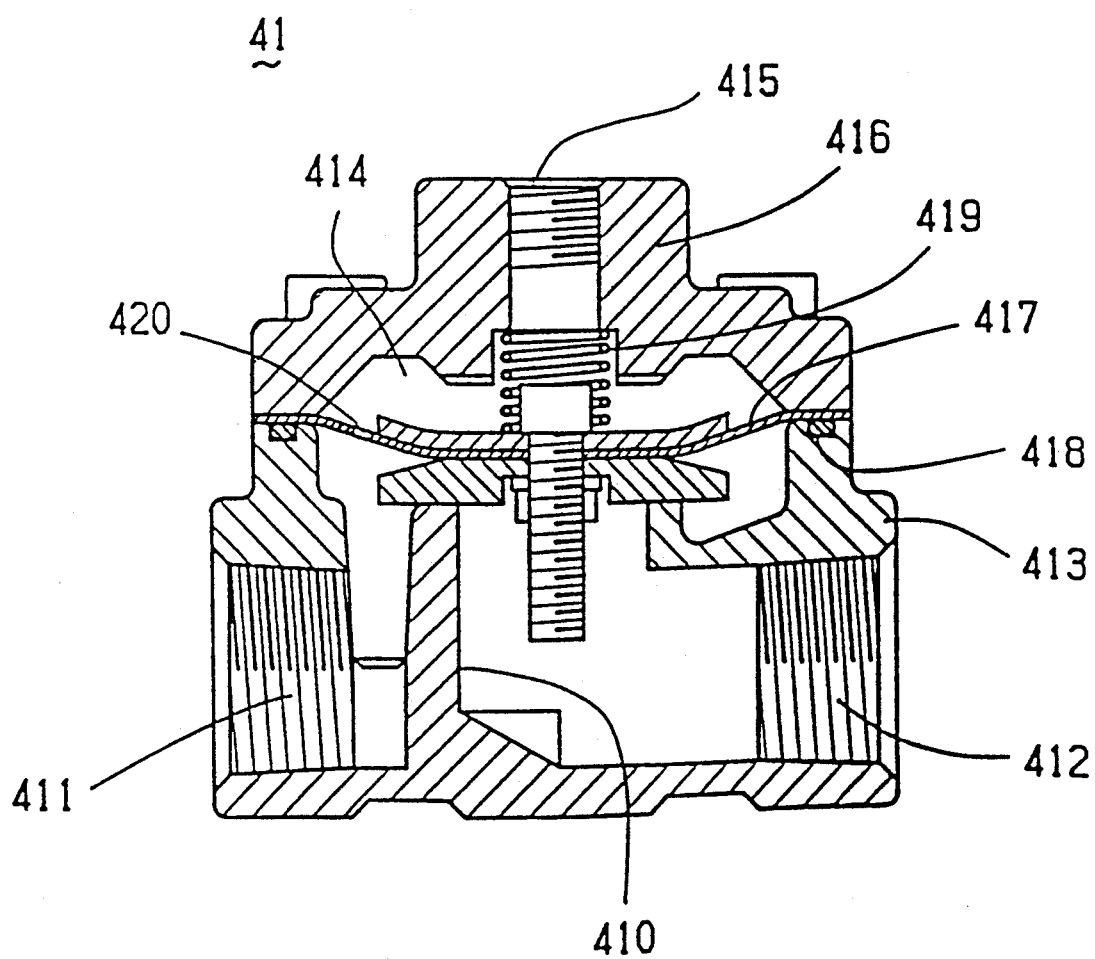
FIG. 2 is a sectional elevation view showing an example of the hydraulic valve used in the present invention.
Figure 3:
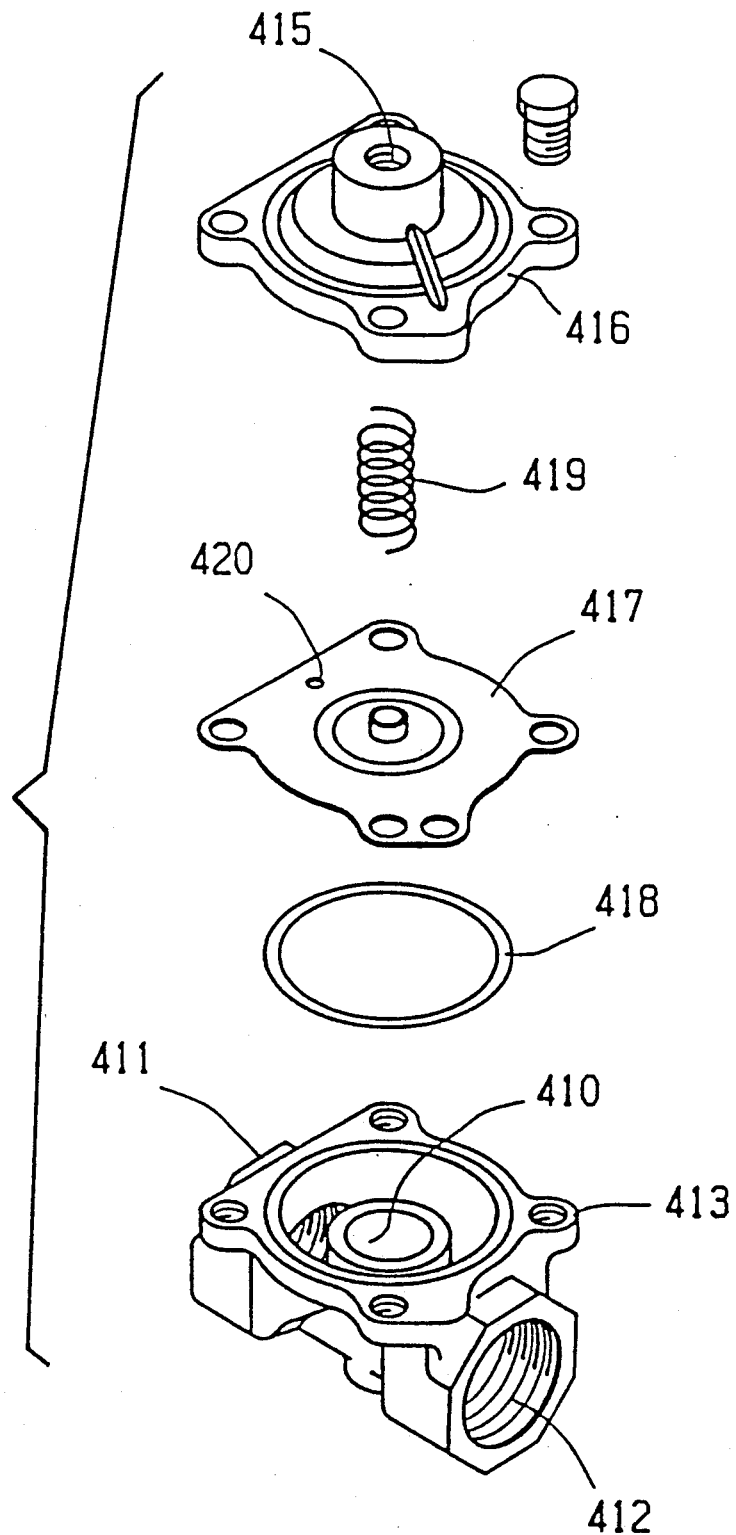
FIG. 3 is an exploded perspective views of the same valve.

Thus, the hydraulic valve 41 illustrated in any of FIGS. 2 and 3 comprises an open-top body 413 having a dividing wall 410 defining an inflow passageway 411 and an outflow passageway 412, an internal cavity 414 communicating with said inflow and outflow passageways 411, 412 and a pilot line coupling 415, a bonnet 416 mounted so as to cover the top opening of the body 413, a diaphragm 417 interposed between the body 413 and the bonnet 416 so as to block the top opening, an O-ring 418 interposed between the bottom periphery of said diaphragm 417 and the top periphery of said body 413, and a spring 419 interposed between said diaphragm 417 and said bonnet 416 and preenergizing said diaphragm 417 against the top opening of body 413, said diaphragm 417 having a small-diameter passageway 420 in a position adjacent to the inflow passageway 411 of body 413 so that the inflow passageway 411 of body 413 is communicating with the pilot line coupling 415 through said small-diameter passageway 420.

Figure 4:
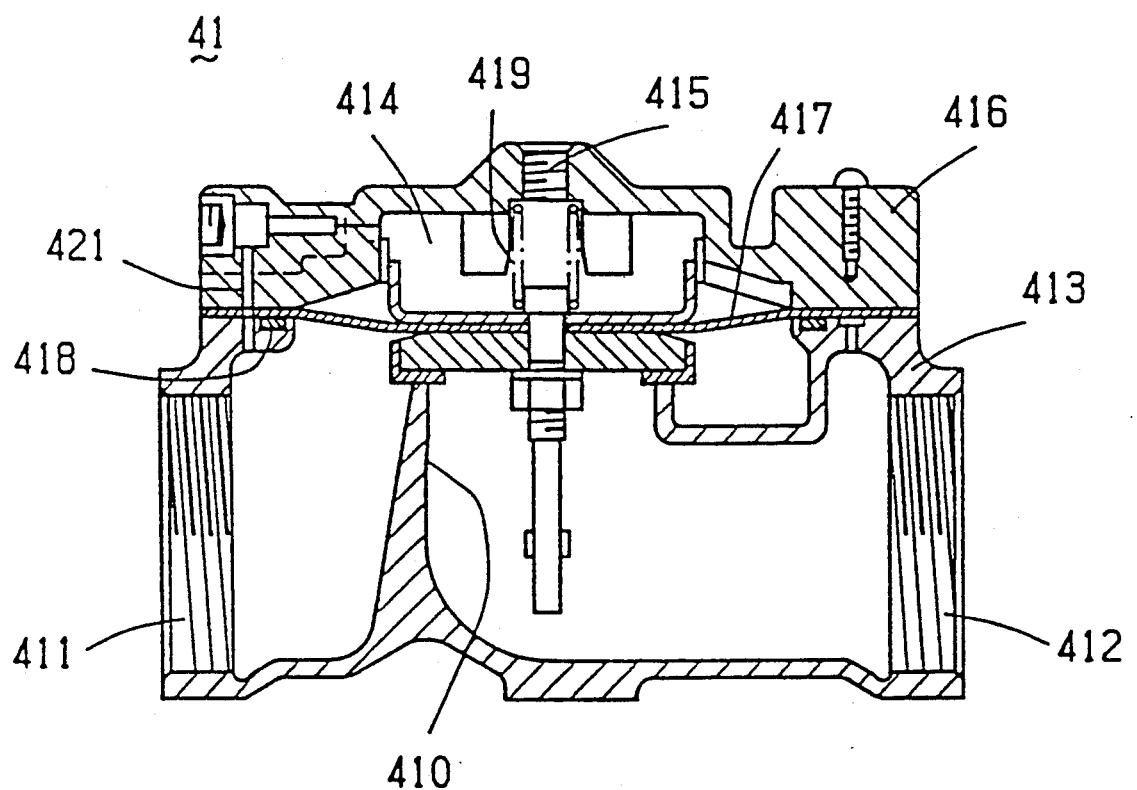
FIG. 4 is a sectional view illustrating another example of the hydraulic valve used in the present invention.

In the hydraulic valve 41 illustrated in FIG. 4, a water channel 421 connecting said inflow passageway 411 with said pilot line coupling 415 is formed through the body 413 and bonnet 416 in lieu of said small-diameter passageway 420 in said diaphragm 417 in the above embodiment.

Figure 5:
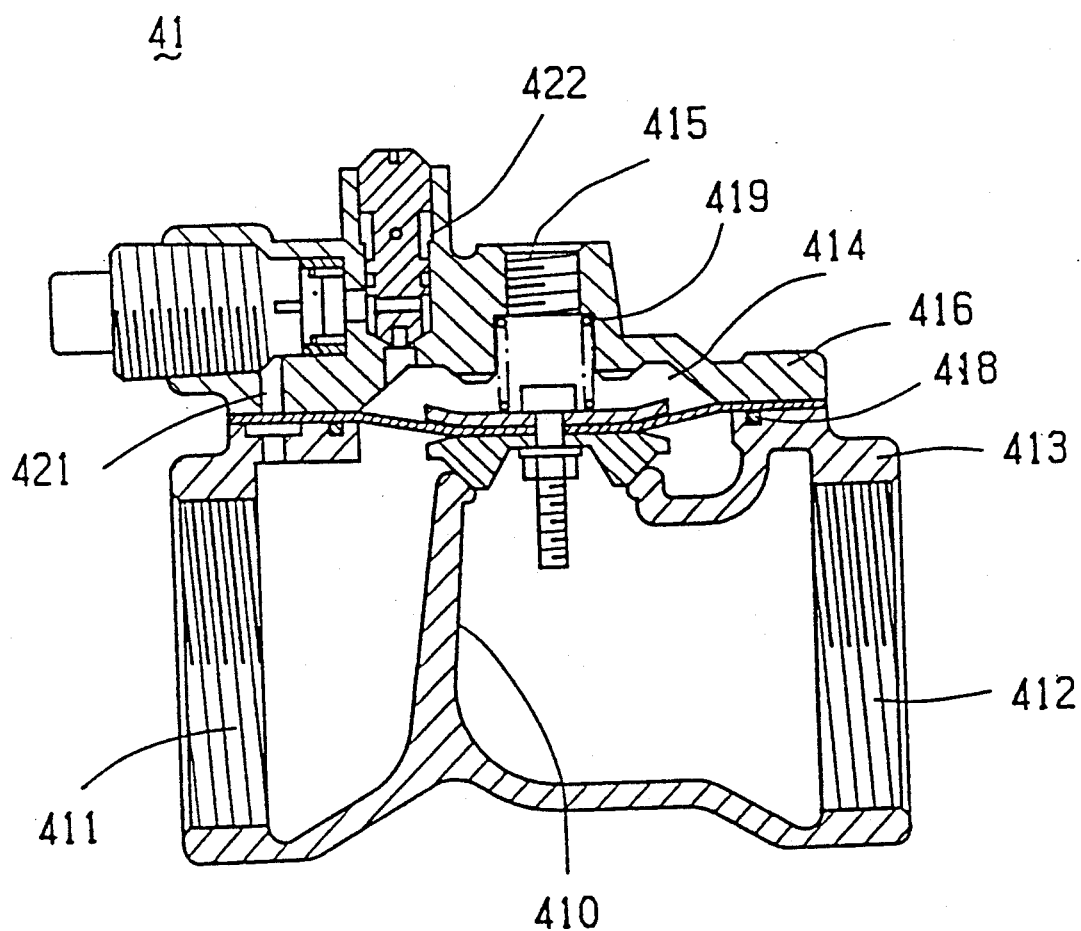
FIG. 5 is a sectional elevation view showing still another example of the hydraulic valve used in the present invention.

The hydraulic valve 41 illustrated in FIG. 5 is such that the bonnet 416 shown in FIG. 4 is provided with a water channel 421 and an air bleeding orifice 422.

Of whichever of the above constructions, the hydraulic valve 41 is such that its inflow passageway 411 communicates with the pilot line coupling 415 at all times and when the two-way pilot solenoid valve 44 connected to the pilot line 42 is in open position, the water in the inflow passageway 411 flows into the pilot line coupling 415 through said passageway 420 or water channel 421 and is discharged from the drain line 43 connected to the two-way pilot solenoid valve 44. Therefore, in this condition the hydraulic pressure in the pilot line 42 and the cavity 414 of the bonnet 416 of the hydraulic valve 41 is substantially nil, with the result that the diaphragm 417 is pushed by water pressure toward the bonnet 416 overcoming the resilient biasing force of said spring 419. In consequence, the inflow passageway 411 is brought into communication with the outflow passageway 412 so that the water flows from the inflow passageway 411 to the outflow passageway 412. On the contrary, when the two-way pilot solenoid valve 44 is in closed position, there is no drainage of water from the drain line 43 connected to the solenoid valve 44 so that the hydraulic pressure within the pilot line 42 and the internal cavity 414 of bonnet 416 is increased. As a consequence, the diaphragm 417 is pushed toward the body 413 to block the communication between the inflow passageway 411 and outflow passageway 412. While the above open-and-close operation is repeated, the pilot line 42 is full of water at all times.

The above-mentioned pilot solenoid valve is a valve operated by a solenoid. This solenoid valve 44 is connected, at one end thereof, to said pilot line 42 and, at the other end, to the drain line 43. The free end of the drain line 43 discharges into a drain gutter or the ground. The two-way pilot solenoid valve 44 is installed on the ground or in a box set at ground level.

The solenoid valve controller 46 mentioned hereinbefore controls the open-and-close operation of the two-way pilot solenoid valve 44. This solenoid valve controller 46 is disposed near said two-way pilot solenoid valve 44 and connected thereto through a lead wire 48. The lead wire 48 is preferably as short as possible.

The operation of the automatic water sprinkler control system of the present invention is explained below.

As a control signal instructing the sprinkling of water is transmitted from the wireless communications equipment 11 of the main controller 1, this signal is relayed by the relay 5 and received by an antenna 49 of the signal receiver-transmitter 45 of the sprinkler controller 4. The relay 5 receiving a station group code transmits a similar control signal to the sprinkler controller 4 within the corresponding group.

Having received the above-mentioned control signal, the solenoid valve controller 46 feeds an electric current according to the control signal to the two-way pilot solenoid valve 44 via the lead wire 48. Thereupon the two-way pilot solenoid valve 44 is opened. Then, the water in the pilot line 42 is drained from the drain line 43 via the solenoid valve 44 so that the hydraulic pressure in the pilot line 42 and the internal cavity 414 of the bonnet 416 of the hydraulic valve 41 is substantially reduced to zero. Consequently, the diaphragm 417 is pushed by the hydraulic pressure toward the bonnet 416 against the residency of the spring 419. As a result, the inflow passageway 411 is brought into communication with the outflow passageway 412 and the water flows from the inflow passageway 411 to the outflow passageway 412 so that the water is delivered from the sprinkler 2. Then, the wireless receiver-transmitter 45 transmits an answer signal indicating the start of water sprinkling to the main controller 1. If something is wrong with the two-way pilot solenoid valve 44 and/or the hydraulic valve 41, the wireless receiver-transmitter 4 transmits an answer signal indicating the valve trouble to the main controller 1.

When a control signal instructing the stop of water sprinkling is transmitted from the main controller 1 and received by the antenna 49 of the signal receiver 45, the solenoid valve controller 46 arrests the flow of an electric current to the two-way pilot solenoid valve 44 to close the solenoid valve 44. Thereupon the drain of water from the drain line 43 connected to the solenoid valve 44 stops and the hydraulic pressure in the pilot line 42 and the internal cavity 414 of the bonnet 416 is increased. As a result, the diaphragm 417 is pressed toward the body 413 and the inflow passageway 411 is secluded from the outflow passageway 412 again, whereby the sprinkling of water from the sprinkler 2 is suspended. Then, the wireless receiver-transmitter 45 transmits an answer signal indicating the stop of water sprinkling to the main controller 1.

We claim:

1. An automatic water sprinkler control system comprising:
    a main control means having a wireless communications equipment;
    at least one water sprinkling means disposed in an area to be sprinkled with water and adapted to sprinkle water over said area;
    a water piping installed between a water source and said water sprinkling means and adapted to distribute water from said water source to said water sprinkling means; and
    a water sprinkling control means installed on the ground in a position close to said water sprinkling means and adapted to control said water sprinkling means, said water sprinkling control means comprising:
    a) a hydraulic valve disposed in said water piping in a position close to said water sprinkling means, said hydraulic valve having a diaphragm which can be opened and closed, said diaphragm including a small diameter passageway formed in a flexible portion thereof connecting an inflow passageway of the hydraulic valve to a flow passageway connected to a pilot line;
    b) a two-way pilot solenoid valve connected at one port thereof to said hydraulic valve through said pilot line and at the other port to a drain piping and adapted to control said hydraulic valve;
    c) a wireless signal receiving-transmitting means adapted to receive a control signal from said main control means and to transmit an answer signal to said main control means;
    d) a solenoid valve control means which is disposed in the vicinity of said two-way pilot solenoid valve, connected to said wireless signal receiving-transmitting means and adapted to control said two-way pilot solenoid valve according to said control signal received by said wireless signal receiving means; and
    e) a power supply means for supplying electric power to said wireless signal receiving-transmitting means and said solenoid valve means.

2. An automatic control system, comprising:
    a main control means having a wireless communication equipment;
    at least one water sprinkling means disposed in an area to be sprinkled with water and adapted to sprinkle water over said area;
    a water piping installed between a water source and said water sprinkling means, and adapted to distribute water from said water source to said water sprinkling means; and
    a water sprinkling control means installed on the ground in a position close to said water sprinkling means and adapted to control said water sprinkling means, said water sprinkling control means comprising;
    a) a hydraulic valve disposed in said water piping in a position close to said sprinkling means, said hydraulic valve having a water channel connecting an inflow passageway of the valve with a flow passageway to which a pilot line is connected, said water channel being provided with an air bleeding orifice which can be opened and closed with respect to the atmosphere;
b) a two-way pilot solenoid valve connected at one port thereof to said hydraulic valve through said pilot line, and at the other port to a drain piping and adapted to control said hydraulic valve,
c) a wireless signal receiving-transmitting means adapted to receive a control signal from said main control means and to transmit an answer signal to said main control means,
d) a solenoid valve control means which is disposed in the vicinity of said two-way pilot solenoid valve, connected to said wireless signal receiving-transmitting means and adapted to control said two-way pilot solenoid valve according to said control signal received by said wireless signal receiving means, and
e) a power supply means for supplying electric power to said wireless signal receiving-transmitting means and said solenoid valve means.

* * * * *